C. H. RIGGS.

Planer Chuck.

No. 3,121.

Reissued Sept. 15, 1868.

WITNESSES

M. Gardner

W. H. Fuller

INVENTOR

Charles H. Riggs

Per Gardner & Hyde

Attys.

N. PETERS, Photo-Lithographer, Washington, D. C.

United States Patent Office.

CHARLES H. RIGGS, OF WINDSOR LOCKS, CONNECTICUT.

*Letters Patent No.* 78,132, *dated May* 19, 1868; *reissue No.* 3,121, *dated September* 15, 1868.

IMPROVEMENT IN PLANER-CHUCKS.

The Schedule referred to in these Letters Patent and making part of the same.

TO ALL WHOM IT MAY CONCERN:

Be it known that I, CHARLES H. RIGGS, of Windsor Locks, Hartford county, State of Connecticut, have invented certain new and useful Improvements in Planer-Chucks; and I do hereby declare that the following is a full and clear description thereof, reference being had to the accompanying drawings, and to the letters of reference marked thereon.

In the drawings—

Figure 1:
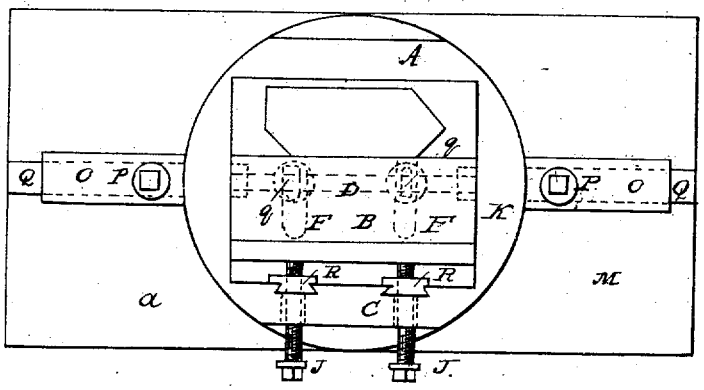
Figure 1 is a plan view.
Figure 2:
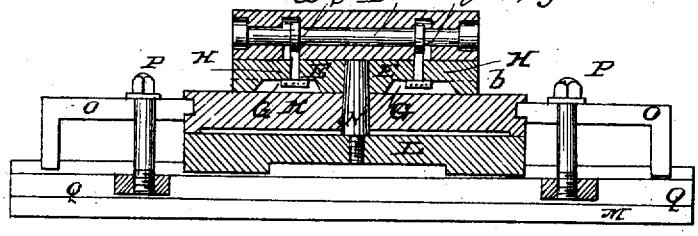
Figure 2 is a side sectional view.
Figure 3:
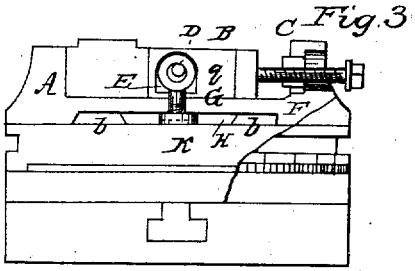
Figure 3 is a sectional end view.

The object of this invention is to produce a chuck by which can be obtained two distinct results, hitherto unattained, viz, quickly and easily securing the stock, and securing it without rapping down, and then bringing the stock to the action of the cutter at any desirable angle upon a horizontal plane, by merely rotating the body of the chuck upon its base, a scale of angles being marked upon the body of the chuck, to give accuracy to the movement, this scale being marked at the contiguous edges of these two parts, *i. e.*, the body and the base.

In construction, the chuck proper is formed upon the plate K, which rotates upon the base, L. The plate K is formed with a stationary projection, C, on one side, and a fixed jaw, A, on the opposite side, a movable jaw, B, traversing between them. In the projection C are round or dove-tailed adjustable nuts R R, into which are fitted screws, J J. The peculiar arrangement and construction of the movable jaw B and its auxiliaries, and the manner in which it is operated by the nuts R R and screws J J, form the principal part of my invention, producing the specific results heretofore mentioned.

In explaining this construction and arrangement, I will first enumerate in order the peculiar qualities of these parts, and results obtained by them, more particularly, and then enumerate the means employed to produce them.

I. The jaw B can be clamped at any desired position, by simply turning a shaft running lengthwise through it, the position including an inclined one, in regard to the fixed jaw A, as well as a parallel one, as the jaw B may be set at an angle with the jaw A, either way.

II. It clamps the stock between itself and the jaw A, holding it down at first pressure.

III. The screws J J, which force the jaw B against the stock, are so arranged that they assist the jaw B in its operation of holding down the stock.

IV. The action of clamping down the jaw B draws the stock down to the face of the chuck.

The jaw B has, running lengthwise through it, a shaft, D, each end of which has a square bolt-head, for the purpose of turning it at either end of the jaw by means of a wrench. Connected with this shaft, and extending downwards through the lower side of it, are eye-bolts, E E. These enter through parallel slots, F and F, crossing the face of the chuck, and have round nuts, G G, on their lower ends, which play in grooves, H and H, made for them under the slots F F.

By turning the shaft D, which has two eccentric-surfaces upon it, at *a* and *a*, upon which the eye-bolts E and E are arranged at their upper ends, the latter are drawn upwards by the eccentric motion of the parts *a* and *a* of the shaft, and press their nuts G and G against the top part of their grooves H and H, clamping the jaw B in the position it may perchance be placed.

In order to prevent the grooves H H from being clogged up by chips and other foreign matter, they are provided with openings, *b b*, &c., in the side, which also afford an opening for screwing up the nuts G and G, when they, as well as the grooves H H, become worn by use and need tightening, the nuts being made round, with holes in their perimeters, for this purpose.

In order to accomplish the clamping of the jaw B at an angle, the depressions or cavities *d d* on its under side are made longer than the width of the eyes of the bolts E and E, the extra length being on the outside edge of the eye from towards the centre of the shaft, when the jaw is straight or parallel to the projection C and fixed jaw A. The eye-bolts fit close to the inner face of the depressions or cavities *d d*, thus leaving room for them to bear further apart, when the jaw B is placed slantingly.

In order to prevent the tendency of the jaw B to tip up, when pressed against the stock by the screws J J, I place the shaft D out of centre laterally, so that its centre is about one-third distance from the front face of the jaw or face next to the stock of the whole width of the jaw, and as the screws J J are arranged in sliding nuts R R, their ends may be pressed against the back face of the jaw, at a point considerably higher than the centre of the bearing-surface of the stock, thus, in connection with the position of the eccentric-shaft D, rendering it impossible for the front edge of the jaw B to tip up, as the entire tendency would be to press in an opposite direction.

In ordinary chucks, the jaw B is made with the back face cut away, for the purpose of attaching it to the face of the chuck with bolts whose heads are brought below the level of the top of the jaw. This leaves only a narrow edge for the ends of the screws J and J to press against, and they have no surface which is even elevated so far as the centre of the jaw which they can press against. By connecting my jaw B with eye-bolts E and E through the bottom, it leaves the back surface fully as deep as the front, enabling the screws J and J to find a bearing-surface anywhere in the height of the bearing of the front face against the stock.

Thus far I have described the top part or chuck proper. This part, mounted on the plate K, is arranged upon a base, L, of the same diameter as the plate K, so that the upper part can be revolved, while the base, L, remains stationary upon the bed M, hereafter described.

A central tapered stud, N, with a screw cut at the lower end, forms the pivot for the upper part of the chuck. This stud screws into the base, L, and remains stationary, while the upper part of the chuck turns upon it, a seat being made, correspondingly tapered, for it in the body of the chuck. As the seat and the stud-pin wear by constant use, the wear may be compensated for by turning the pin, so as to unscrew it slightly out of the base, L, until it fits closely again, a slot being cut in the top of the pin for the operation of a screw-driver.

The scale is cut upon the plate K and base L at their contiguous edges.

The bed M consists of a longitudinal plate, with a dove-tailed groove, Q, running lengthwise through the centre and opening at the top. An angle-iron, O, at each side of the chuck, performs the duty of clamping the chuck in position to this bed by means of bolts P, one to each angle, these bolts having square heads at their upper ends, where they pass through the horizontal arms of the angles, and nuts at their lower ends, which fit into and slide in the groove Q, when the chuck is adjusted upon the bed. The upper ends of the angles fit into a groove running around the perimeter of the plate K, and the lower ends slide in the groove Q, when the chuck is moved. By turning the bolts P, so as to screw into the nuts at their lower ends, the angle-irons are clamped to the bed, and by them the chuck.

The screws J J, forming the vise, are arranged to pass through adjustable nuts R R, which slide vertically in dove-tailed grooves, so that the points of the screws may bear against whatever portion of the jaw B vertically that may be desired.

Figure 4:
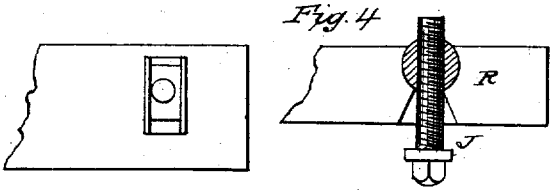
Figure 4 is a detailed view of a part of the same.

In fig. 4, the nuts R R are shown as being round, and fitted into sockets formed in the projection C, so that the screws may be adjusted laterally as well as vertically, enabling them to press at right angles to the jaw B when it is clamped at an angle.

Now, having described my invention, what I claim as new, and desire to secure by Letters Patent, is—

1. In combination with the movable jaw B and slotted chuck-bed *b*, the eccentric-shaft D, with eye-bolts E E and nuts G G, arranged towards the front of the jaw, the jaw being constructed with a back surface equally as high as the front or surface next to the stock, substantially as herein shown, and for the purpose set forth.

2. The device for fastening the chuck to the base-plate M, consisting of the plate K, with annular groove, bed-plate L, angle-irons O, threaded pin B, with nut, and groove Q in base-plate M, all constructed and arranged in the manner described.

3. The arrangement of the round or dove-tailed nuts R R, screws J J, stationary jaw C, and the movable jaw B, substantially as shown and set forth.

CHAS. H. RIGGS.

Witnesses:

R. P. HYDE,

E. H. HYDE.